United States Patent [19]

McMahon

[11] Patent Number: 5,251,777
[45] Date of Patent: Oct. 12, 1993

[54] WATER BOTTLE AND MOUNTING BRACKET

[75] Inventor: Sean J. McMahon, Stockton, Calif.

[73] Assignee: Great Relief Products, Inc., Stockton, Calif.

[21] Appl. No.: 977,061

[22] Filed: Nov. 16, 1992

[51] Int. Cl.⁵ ................... F16M 13/02; B62J 11/00
[52] U.S. Cl. ........................... 220/480; 224/35; 224/39; 248/291; 248/311.2
[58] Field of Search .............. 220/480, 737, 751; 224/35, 36, 39, 41; 248/70, 103, 105, 274, 291, 311.2

[56] References Cited

U.S. PATENT DOCUMENTS

| | | | |
|---|---|---|---|
| 2,086,355 | 7/1937 | Eansor | 248/291 |
| 2,883,134 | 4/1959 | O'Halloran | 248/311.2 X |
| 3,021,106 | 2/1962 | Kramer | 248/226 |
| 3,269,683 | 8/1966 | Shinaver | 248/230 |
| 3,317,171 | 5/1967 | Kramer | 248/229 |
| 3,533,526 | 10/1970 | Adell | 248/311.2 X |
| 3,734,439 | 5/1973 | Wintz | 248/291 X |
| 4,434,961 | 3/1984 | Hoye | 248/311.2 |
| 4,697,780 | 10/1987 | Wenkman | 248/558 |
| 4,807,935 | 2/1989 | King | 248/291 X |
| 4,830,240 | 5/1989 | Tackles et al. | 224/35 |
| 4,957,227 | 9/1990 | Trimble | 224/39 |
| 5,007,612 | 4/1991 | Manfre | 248/558 |
| 5,040,709 | 8/1991 | Neugent | 224/35 |
| 5,170,981 | 12/1992 | Lin | 224/39 X |

*Primary Examiner*—Steven M. Pollan
*Attorney, Agent, or Firm*—Walter A. Hackler

[57] ABSTRACT

Bottle and bracket apparatus in accordance with the present invention includes a mounting plate and a device for fixing the mounting plate to a rail. A bracket is provided for supporting a bottle with the bracket being mounted to the mounting plate in a manner enabling rotation and selective fixing of the bracket at various angular positions. A bottle is provided for both preventing selection of the various angular positions when the bottle is supported by said bracket and for containing a liquid.

7 Claims, 2 Drawing Sheets

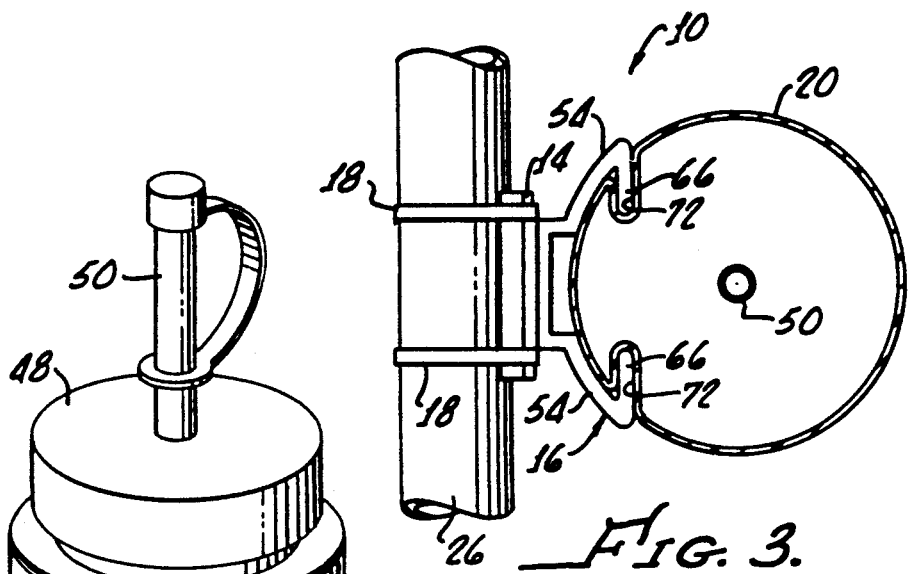
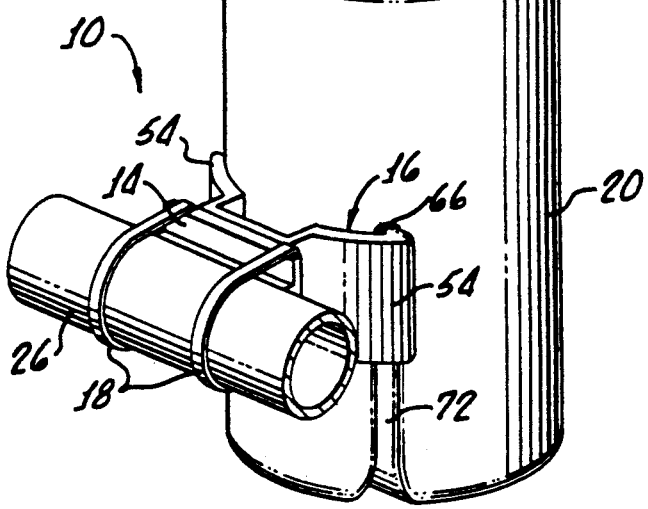
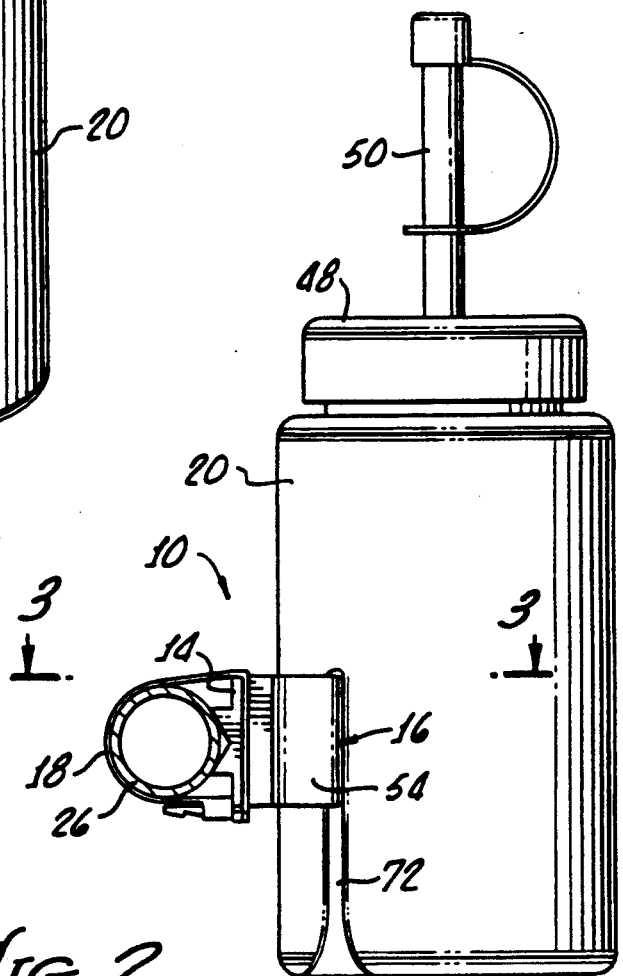

WATER BOTTLE AND MOUNTING BRACKET

The present invention generally relates to containers for liquids, and more particularly to a beverage bottle, or container, and mounting bracket apparatus for enabling the bottle to remain upright when the bracket is clamped to a railing of various types of equipment, such as physical fitness training equipment, wheelchairs, hospital bed railings, etc. Naturally, the apparatus of the present invention would also be applicable for use in any type of recreational equipment, including lawn and beach chairs, bicycles, and the like and rails available for attachment thereto.

Heretofore, available beverage containers or holders have been produced for specific applications and are not suitable for accommodating equipment having rails at any number of different angular positions with regard to the horizontal.

Further, many devices require specialized installation necessitating the assembly of nuts and bolts and use of hand tools.

Further, heretofore developed beverage containers are not easily remounted, or adjusted, to accommodate a rail which may have a varying angular relationship with a horizontal, depending on specific configurations of the equipment. Such prior devices have required a complete reinstallation of the beverage container if the angle of the rail to which it is attached is changed.

SUMMARY OF THE INVENTION

The present invention is installable on any suitable rail or arm without the necessity of elaborate hand tools and fixing devices. Importantly, the angular relationship of the container means may be adjusted with regard to the rail by simple manual manipulation without requiring remounting or disassembly of the apparatus.

The bottle and bracket apparatus, in accordance with the present invention, generally includes a mounting plate and means for fixing a mounting plate to a rail.

Bracket means are provided and mounted to the mounting plate for supporting a bottle, and means for selectively fixing the bracket to the mounting plate at various angular positions enables a bracket means to support a bottle at an angular relationship to the rail so that spilling of liquid therein will not occur.

Importantly, bottle means are provided for both preventing selection of the various angular positions when the bottle contains a liquid and is supported by the bracket means.

The cooperative relationship between the bottle means and the bracket means ensures that the bracket cannot be rotated with respect to the mounting plate when the bottle means is released.

More particularly, in accordance with the present invention, the bracket means may be rotatably fixed to the mounting means, and the means for selectively fixing the bracket means to the mounting plate may comprise a plurality of holes in the mounting plate and a plurality of protruding pins in the bracket means.

Two pins may be utilized and spaced in a 180° relationship with one another about a mounting bracket rotational axis.

The means for selectively fixing a bracket means to the mounting plate further includes arm means extending outwardly from the bracket means for enabling bending of the bracket means in order to remove the protruding pins from the holes, rotate the bracket means with respect to the mounting plate, and reinsert the protruding pins into a different set of holes, thereby fixing the bracket at various angular relationships with the mounting plate.

Arm means further comprise opposing arm segments and the bottle means includes means defining a groove therein for removably engaging the arm segments in order to prevent bending of the bracket means and rotation of bracket means when the bottle is engaged thereby. As hereinabove described, this ensures that the bottle will not rotate with the bracket when disposed in the arm means.

BRIEF DESCRIPTION OF THE DRAWINGS

The advantages and features of the present invention will be better understood by the following description when considered in conjunction with the accompanying drawings in which:

FIG. 1 is a perspective view of the present invention generally showing a mounting plate secured to a rail, a mounting plate and cooperating bottle;

FIG. 2 is a side view of the apparatus in accordance with the present invention;

FIG. 3 is a cross sectional view of the apparatus taken along line 3—3 shown in FIG. 2;

DETAILED DESCRIPTION

Figure 4:
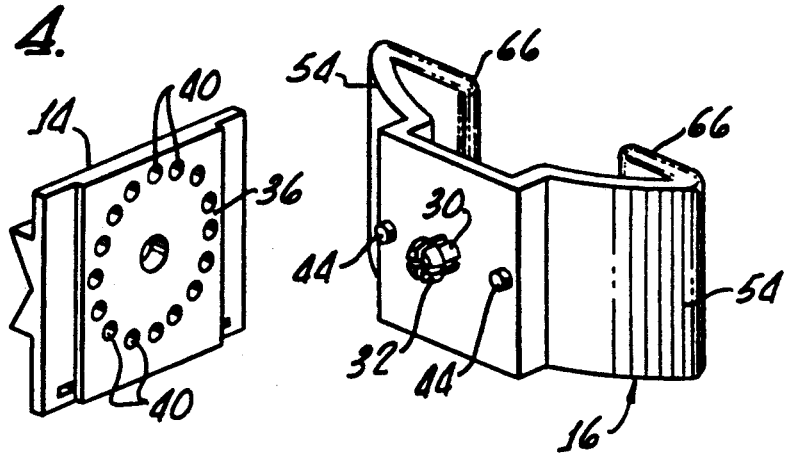
FIG. 4 is a perspective view of the mounting plate and mounting bracket in accordance with the present invention showing holes and pins therein for enabling rotation of the mounting bracket with respect to the mounting plate.

Turning now to FIGS. 1-3, there are shown a bottle and bracket apparatus 10, in accordance with the present invention, generally including a mounting plate 14, a bracket 16, straps 18, and a bottle 20.

As can be seen from the drawing, the straps 18 provide a means for fixing the mounting plate 14 to a rail 26, or the like, and the bracket 16 provides a means for supporting the bottle 20.

As most clearly shown in FIG. 4, the bracket 16 is rotatably fixed to the mounting bracket by means of a split rivet 30, formed as part of the bracket 16 or separately inserted therethrough. A head 32 on the split rivet 30 extends through a hole 36 in the plate 14. Insertion of the head 32 into the hole 36 causes compression of the split rivet 30, enabling passage of the head 32 through the hole 36. Upon full insertion, the split rivet 30 expands, causing the head 32 to prevent removal of the bracket 16 from the plate 14.

Figure 5:
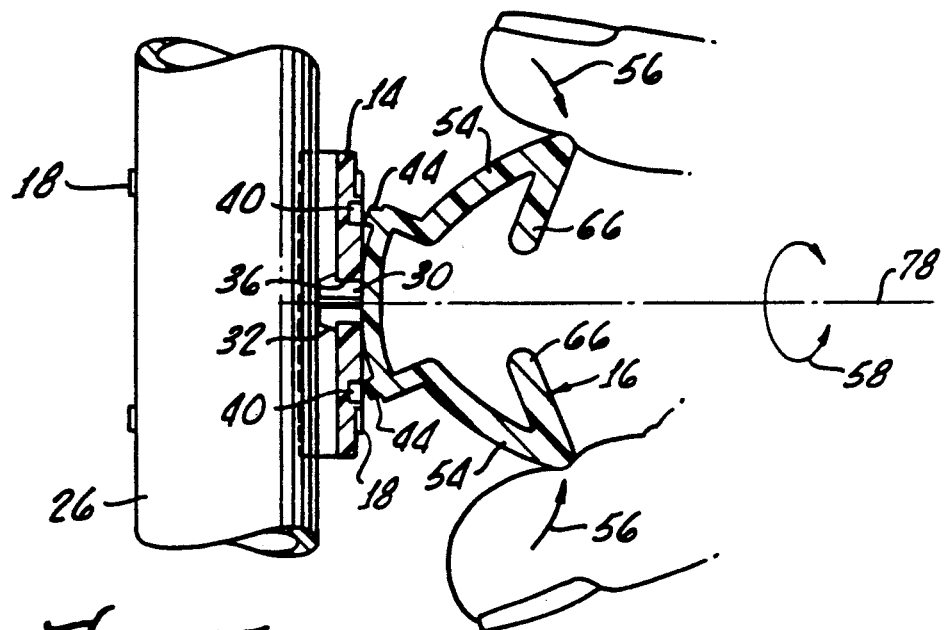
FIG. 5 is a partial cross sectional view of the mounting plate and bracket illustrating manual bending of the mounting plate to enable rotation thereof when the pins are pulled from corresponding holes in the mounting plate.
Figure 6:
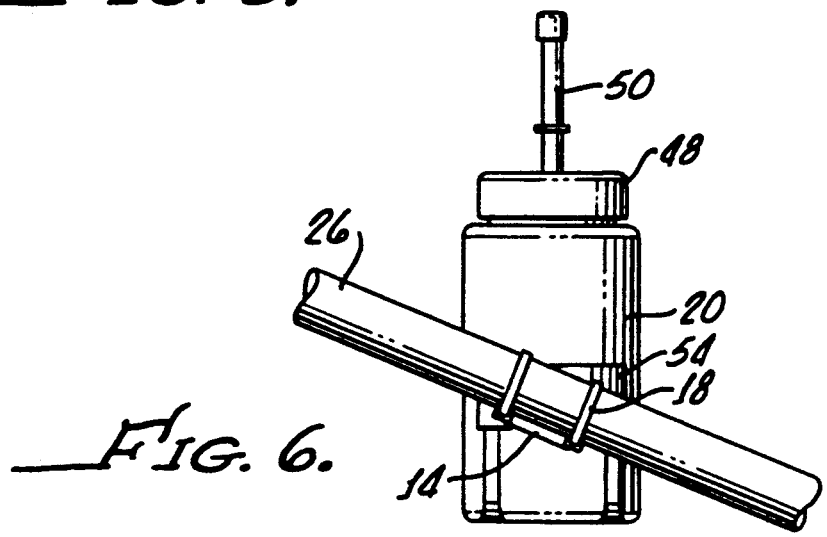
FIG. 6 shows the apparatus in accordance with the present invention showing installation on an inclined rail.

As shown in FIGS. 4-5, a plurality of indentations, or holes, 40 and a plurality of protruding pins 44 in the bracket 16 provide means for selectively fixing the bracket 16 to the mounting plate 14 at various angular positions. This enables the apparatus of the present invention to provide generally vertical support for the bottle 20, despite the angular relationship of the rail 26 with respect to the bracket 16 and bottle 20, see FIG. 6.

Importantly, the bottle 20 provides a means not only for containing a liquid (not shown) but also for preventing selection of the various angular positions thereof when the bottle 20 is supported by the bracket 16 as hereinafter discussed in greater detail.

To facilitate the use of the bottle, a conventional cap 48 and straw 50 are provided.

In addition to the holes 40 and pins 44, the bracket 16 includes outwardly extending arms 54 which enable bending of the bracket 16 in order to remove the protruding pins 44 from the holes 40, rotate the bracket 16 (as shown by the arrow 58 in FIG. 5), and reinsert the pins 44 into a different set of holes thereby fixing the bracket 16 at a different angular relationship with the mounting plate 14.

The mounting plate 14 and bracket 16 may be formed from any suitable plastic or resilient material, such as nylon or the like, which enable bending of the arms 54 in the direction of arrows 56 so that the pins 44 may be removed from the holes 40 and the bracket 16 rotated as hereinabove described.

Opposing arm segments 66, formed as part of the arms 54 and the bracket 16, are sized for engaging grooves 72 in the bottle and provide a means for engaging the arms 54 by means of the arm segments 66, in order to prevent bending of the arms 54 and bracket 16, and for supporting the bottle in an upright position within the arms 54.

A plurality of alternative angular positions maintain the bracket 16 and the mounting plate 14 provided by the holes 44 which may be arranged in a circular pattern about a rotational axis 78, and the pins 44 may be disposed at a 180° relationship from one another about the bracket rotational axis 78.

Although there has been hereinabove described a water bottle and mounting bracket in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. Bottle and bracket apparatus comprising:
   a mounting plate;
   means for fixing said mounting plate to a rail;
   bracket means, rotatably mounted to said mounting plate, for supporting a bottle;
   means for selectively fixing said bracket to said mounting plate at various angular positions, said means for selectively fixing said bracket means to said mounting plate further comprising a plurality of holes in said mounting plate, a plurality of protruding pins in said bracket means and arm means, outwardly extending from said bracket means, for enabling bending of the bracket means in order to remove said protruding pins from said holes, rotate the bracket means with respect to the mounting plate and reinsert the protruding pins into a different set of holes thereby fixing the bracket means at various angular relationships with said mounting plate; and
   bottle means for both preventing selection of the various angular positions when the bottle is supported by said bracket means and for containing a liquid.

2. The apparatus according to claim 1 wherein said arm means comprises opposing arm segments and said bottle means comprises means, defining a groove in said bottle, for removable engaging said arm segments in order to prevent bending of said bracket means and rotation of the bracket means.

3. The apparatus according to claim 1 wherein said bottle means comprises groove means for engaging said bracket means in order to prevent bending thereof and for supporting said bottle means in an upright position within the arm means.

4. The apparatus according to claim 1 wherein said plurality of holes is arranged in a circular pattern around a rotation axis of the bracket means.

5. The apparatus according to claim 4 wherein said arm means comprises opposing arm segments for engaging said groove means.

6. The apparatus according to claim 5 wherein the means, for selectively fixing said bracket means to said mounting bracket comprises two protruding pins disposed 180° from one another about the bracket means rotation axis.

7. Bottle and bracket apparatus comprising:
   a mounting plate having a plurality of radially spaced apart indentations, said indentations being symmetrical about a center in said mounting plate;
   strap means for fixing said mounting plate to a rail;
   bracket means, rotatably mounted to said mounting plate and having spaced apart protrusions sized for engaging said indentations, said bracket means including arm means for enabling bending of the bracket means in order to remove said protrusions from said indentations, rotate the bracket means with respect to the mounting plate, and reinsert the protrusions into a different set of indentations thereby fixing the bracket means at various angular relationships with said mounting plate; said arm means including opposing arm segments; and
   a bottle, including groove means formed therein, for engaging said arm segments and preventing bending of the bracket means.

* * * * *